United States Patent
Zhao et al.

(10) Patent No.: US 11,663,037 B2
(45) Date of Patent: May 30, 2023

(54) SERVICE INFORMATION PROCESSING METHOD, APPARATUS, DEVICE AND COMPUTER STORAGE MEDIUM

(71) Applicant: Beijing Baidu Netcom Science and Technology Co., Ltd., Beijing (CN)

(72) Inventors: Jie Zhao, Beijing (CN); Jian Tian, Beijing (CN); Shuailong Li, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 156 days.

(21) Appl. No.: 17/211,315

(22) Filed: Mar. 24, 2021

(65) Prior Publication Data

US 2021/0271511 A1 Sep. 2, 2021

(30) Foreign Application Priority Data

Sep. 29, 2020 (CN) .......................... 202011052975.0

(51) Int. Cl.
*G06F 9/46* (2006.01)
*G06F 9/48* (2006.01)
*G06F 9/50* (2006.01)

(52) U.S. Cl.
CPC ............ *G06F 9/485* (2013.01); *G06F 9/5083* (2013.01)

(58) Field of Classification Search
CPC ......... G06F 9/485; C06F 9/508; C06F 9/5083
See application file for complete search history.

(56) References Cited

U.S. PATENT DOCUMENTS

| 7,434,204 | B1 | 10/2008 | Everingham et al. |
| 9,397,905 | B1 | 7/2016 | Moniz et al. |
| 2002/0013802 | A1* | 1/2002 | Mori .................. G06F 11/1484 718/1 |
| 2006/0064695 | A1 | 3/2006 | Burns et al. |
| 2015/0180736 | A1* | 6/2015 | Leung ................ H04L 41/5054 709/226 |
| 2017/0031623 | A1* | 2/2017 | Gong ...................... G06F 3/065 |
| 2017/0339196 | A1* | 11/2017 | Lewis .................. H04L 63/083 |

(Continued)

FOREIGN PATENT DOCUMENTS

| CN | 105138398 | 12/2015 |
| CN | 105357266 | 2/2016 |

(Continued)

OTHER PUBLICATIONS

Brown, Ethan, author. St. Laurent, Simon, editor.; Web development with node and express; 2014.*

(Continued)

*Primary Examiner* — Camquy Truong
(74) *Attorney, Agent, or Firm* — Amundsen Davis, LLC

(57) ABSTRACT

The application discloses a service information processing method, apparatus, device, and computer storage medium, relating to the technical field of cloud computing. The specific implementation scheme is: sending polling information to a target process of a service running in a container according to a set time interval, wherein the target process is one of a plurality of processes running in the container; receiving reply information returned by the target process in response to the polling information; and obtaining the survival status of the target process according to the reply information.

15 Claims, 8 Drawing Sheets

(56) References Cited

U.S. PATENT DOCUMENTS

| | | |
|---|---|---|
| 2018/0210801 A1 | 7/2018 | Wu et al. |
| 2020/0285496 A1 | 9/2020 | Cropper et al. |
| 2021/0204212 A1* | 7/2021 | Kumar .............. H04W 52/0229 |

FOREIGN PATENT DOCUMENTS

| | | |
|---|---|---|
| CN | 105389243 | 3/2016 |
| CN | 105490870 | 4/2016 |
| CN | 105868233 | 8/2016 |
| CN | 109739640 | 5/2019 |
| CN | 110935167 | 3/2020 |
| EP | 3340057 | 6/2018 |
| EP | 3340057 A1 | 6/2018 |
| JP | 2005078163 A | 3/2005 |
| JP | 2019159977 A | 9/2019 |
| JP | 202038525 | 3/2020 |
| KR | 10-2018-0019674 | 2/2018 |

OTHER PUBLICATIONS

Office Action from the Korean Intellectual Property Office for Application No. 10-2021-0016978 dated Apr. 27, 2022 (10 pages).

Office Action from the European Patent Office for Application No. 21164625.2 dated Jan. 27, 2022 (9 pages).

Felber et al., "Failure Detectors as First Class Objects*," IEEE, Swiss Federal Institute of Technology, Operating Systems Lab, pp. 132-141(1999).

Office Action from the Japanese Patent Office for Application No. 2021-047080 dated Feb. 4, 2021 (8 pages).

Kubernetes, "Core Concepts and Usage of Kubernetes Container Orchestrator," JP Application No. 2021-047080, dated Feb. 4, 2021 (pp. 1-8 with a 1 page English abstract).

Second Office Action from the State Intellectual Property Office of China for Application No. 202011052975.0 dated Feb. 8, 2022 (19 pages).

Anonymous, "Push Technology—Wikipedia," Internet site, Sep. 22, 2020 (Sep. 22, 2020) retrieved froom the Internet: URL:https://en.wikipedia.org/wiki/Push_technology [retrieved on Oct. 22, 2020] 7 pages.

EP21164625.2 Extended European Search Report dated Jul. 27, 2021 (10 pages).

First Office Action from the State Intellectual Property Office of China for Application No. 2020110529750 dated Oct. 11, 2021 (10 pages).

Kelsey Hightower ETC, Kubernetes, Mar. 20, 2018, O'Reilly (9 pages).

Brendan Burns, Joe Beda, Kelsey Hightower, Kubernetes Up & Running, Aug. 2019, Second Edition, O'Reilly, Sebastopol, CA USA (274 pages).

Notice of Grant and Search Report from State Intellectual Property Office of P.R. China, Jul. 4, 2022, (9 pages).

Japanese Office Action for JP Application No. 2021-047080 dated Oct. 4, 2022 (9 pages).

Oral Proceedings Notification from European Patent Office for EP Application No. 21164625.2-1203/3819764 dated Jun. 29, 2022 (13 pages).

* cited by examiner

SERVICE INFORMATION PROCESSING METHOD, APPARATUS, DEVICE AND COMPUTER STORAGE MEDIUM

CROSS-REFERENCE TO RELATED APPLICATION

This application claims priority to Chinese patent application No. 202011052975.0, filed on Sep. 29, 2020, which is hereby incorporated by reference in its entirety.

TECHNICAL FIELD

The application relates to the field of computer technology, in particular to the technical field of cloud computing.

BACKGROUND

A software module running on a network may be referred to as a service, which enables a user in different places to access data on the network or use APP (Application) through different terminal devices. With the development of network technology, the container technology also develops rapidly so that services can be deployed through containers. Internet companies often have huge amounts of heterogeneous services and physical resources within them. In order to manage huge amounts of heterogeneous services and resources more friendly and efficiently, most Internet companies adopt a traditional PaaS (Platform As Service) container management system, which is based on a single container, to realize deployment change and resource virtualization delivery of the traffic.

SUMMARY

The application provides a service information processing method, apparatus, device, and computer storage medium.

According to one aspect of the present application, there is provided a service information processing method including:

sending polling information to a target process of a service running in a container according to a set time interval, wherein the target process is one of a plurality of processes running in the container;

receiving reply information returned by the target process in response to the polling information; and obtaining a survival status of the target process according to the reply information.

According to another aspect of the present application, there is provided a service information processing apparatus including:

a polling module configured for sending polling information to a target process of a service running in a container according to a set time interval, wherein the target process is one of a plurality of processes running in the container;

a reply receiving module configured for receiving reply information returned by the target process in response to the polling information; and a probing module configured for obtaining a survival status of the target process according to the reply information.

According to another aspect of the present application, there is provided an electronic device including:

at least one processor; and a memory communicatively connected to the at least one processor; wherein, the memory stores instructions executable by the at least one processor, the instructions being executed by the at least one processor to enable the at least one processor to execute the method provided by any one of the embodiments of the present application.

A non-transitory computer-readable storage medium having computer instructions stored thereon is provided by any embodiment of the present application, wherein the computer instructions cause a computer to execute the method provided by any one of the embodiments of the present application.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The accompanying drawings are included to provide a better understanding of the scheme and are not to be construed as limiting the application. Wherein.

DETAILED DESCRIPTION

The following describes exemplary embodiments of the present application in conjunction with the accompanying drawings, which include various details of the embodiments of the present application to facilitate understanding, and it should be considered as merely exemplary. Accordingly, one of ordinary skills in the art should appreciate that various changes and modifications can be made to the embodiments described herein without departing from the scope and spirit of the present application. Also, for clarity and conciseness, descriptions of well-known functions and structures are omitted from the following contents.

As the service types increase, how to optimize the container management efficiency and/or the operation cost of the traditional PaaS container management system (PaaS system for short) based on a single container is a problem that the container management system needs to improve.

Figure 1:
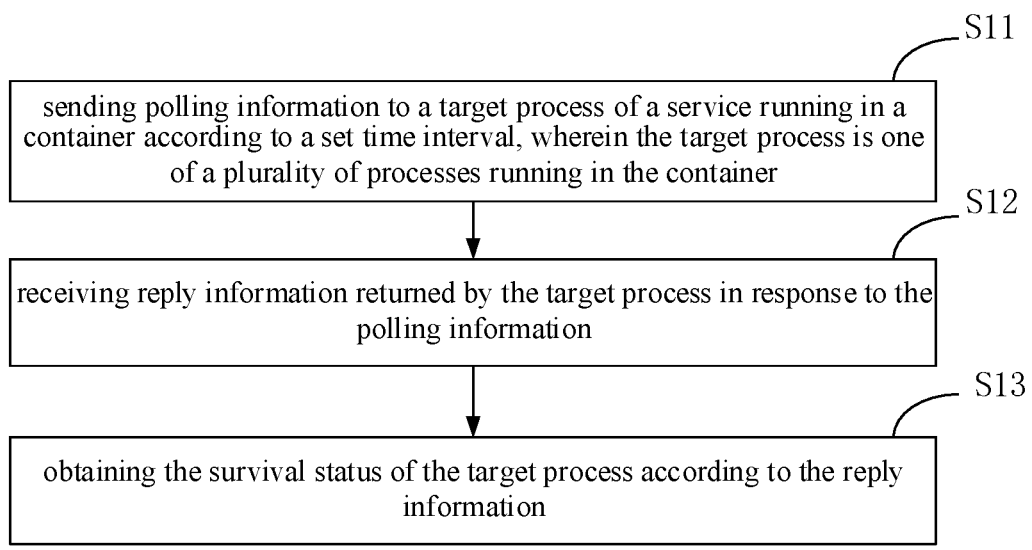
FIG. 1 is a schematic view of a service information processing method according to an embodiment of the present application.

The embodiment of the application provides a service information processing method. As shown in FIG. 1, the service information processing method may include:

S11: sending polling information to a target process of a service running in a container according to a set time interval, wherein the target process is one of a plurality of processes running in the container;

S12: receiving reply information returned by the target process in response to the polling information; and S13: obtaining a survival status of the target process according to the reply information.

According to an embodiment of the present application, the target process is one of a plurality of processes running in a container, and the target process is independently polled to execute target process probing. Therefore, processes in the container can be independently probed, so that multiple processes can be run in a single container to save container resources.

In the embodiment, sending polling information to a target process of a service running in a container may include: sending the polling information to the target process through a port, or sending the polling information to the target process by using a probe, to poll the state of the target process.

In the embodiment, there may be a plurality of processes run in the container, and the plurality of processes may be processes of a same service or do not belong to a same service. For example, a plurality of processes of a critical service A and at least one process of an accompanying service B of the critical service A are run in the container, and the target process may be a process of the critical service A or the accompanying service B. For another example, in a case where a plurality of processes of the critical service A is run in the container and no accompanying service is run therein, the target process is a process of the critical service A.

The plurality of processes running in the container may include critical processes of a critical service, and may also include non-critical processes of an accompanying service of a critical service, wherein the accompanying service of the critical service may be a non-critical service. Both the critical service and the accompanying service of the critical service may, in the container, run an add-on that is different from a process and, in one specific embodiment that does not belong to such an object which can receive the polling information.

The plurality of processes running in the above container may include only critical processes of a critical service, in which case there are only processes of a critical service within the container and no process of a non-critical service.

In a same container, a plurality processes may be isolated by a directory, or by an isolation card, or may not be isolated.

In particular, a plurality of processes in the container may include the Nginx (X Engine) process and the Main process of Service A, and the Service A has a common configuration library (an add-on). It is also possible to run a Sidecar process that does not belong to the service A. The Sidecar process is a process of an accompanying service of the service A, for adding functions to the service A.

With respect to a plurality of processes running in the container, state polling may be carried out on the plurality of processes running in the container through a port or by using a probe. By polling, whether the running of each process is abnormal or not may be known and thus the plurality of processes may be probed.

After receiving the polling information, the target process returns reply information of the polling information. If the reply information is not received or the received reply information is abnormal, it may be determined that the target process is abnormal.

In the embodiment, the obtaining the survival status of the target process according to the reply information may include: determining the survival status of the target process according to whether the reply information is received or not, or according to the content of the received reply information.

In the embodiment, after obtaining the survival status information of the target process, in a case where the survival status is abnormal, the survival status of the target process is recorded. In a case where the target process is a process of a critical service, for example, the target process is the main process of the critical service A in the container, example status abnormity of the critical service A in the container is recorded. In a case where the target process is a process of a non-critical service, for example, the target process is an accompanying process of an accompanying service, only target process status abnormity is recorded.

The functions of recording example status abnormity and recording target process abnormity can include a keep-alive countdown of the service A or the target process. For example, in a case where a set first period is reached after the example status abnormity of the critical service A is recorded, the redeployment of the critical service A is executed. For another example, in a case where the target process is a process of a non-critical service, the target process is restarted in a case where a set second period is reached after the target process status abnormity is recorded or in a case where the target process status abnormity is recorded for a plurality of times.

In a particular implementation, one base (Base) service, which may be a program script, may be deployed in the container, and the PaaS system executes S11-S13 as shown in FIG. 1 by calling the program script.

The script of the base service deployed in the container is used for managing other services to perform probing. Besides, the PaaS system may also call the script of the base service to start and stop other services, load data, and the like, playing the role of a universal service control (Control) script. The universal service control script may control traffic services to be able to be accessed, changed, kept alive, and probed (Status) independently in the container and notify a process to load configured data at startup (Reload), the start (Start) of the process, the stop (Stop) of the process, and the like.

Figure 2:
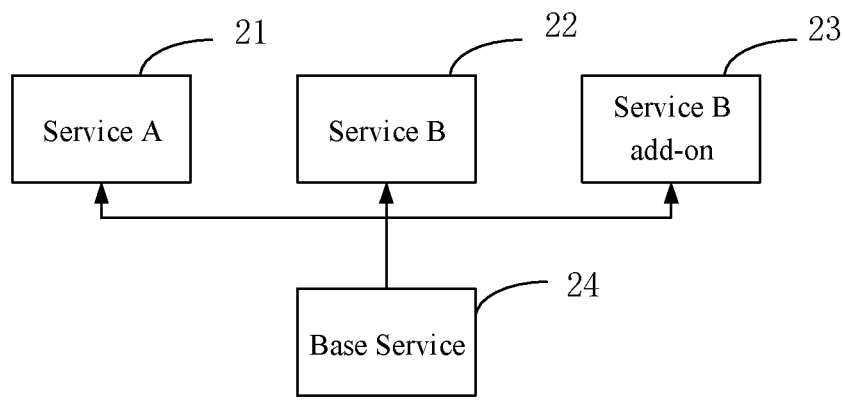
FIG. 2 is a schematic view of an internal architecture of a container according to an example of the present application.

In a case where the traffic service needs to start a process, as for the objects for probing, for example, Service A 21 (Service A) and Service B 22 (Service B) as shown in FIG. 2, Service A and Service B may respectively start at least one process in the container. Add-on (Addon) may not belong to a service process, and is used only for other services to provide configuration or base environment capabilities. Add-on C23 for Service B, as shown in FIG. 2, is (Service B Addon C). For another example, Add-on D for Service A, (Service A Addon D). Still referring to FIG. 2, a base service

24 is called by the PaaS system for the start, stop, data reloading, and probing operations of service A 21, service B 22, and service B add-on C 23.

In the embodiment, the target process is one of a plurality of processes running in the container, and the target process is independently polled to execute target process probing. Therefore, other processes in the container may be independently probed such that multiple processes may be run in a single container based on the traditional PaaS single container, and thus container resources may be saved.

Figure 3:
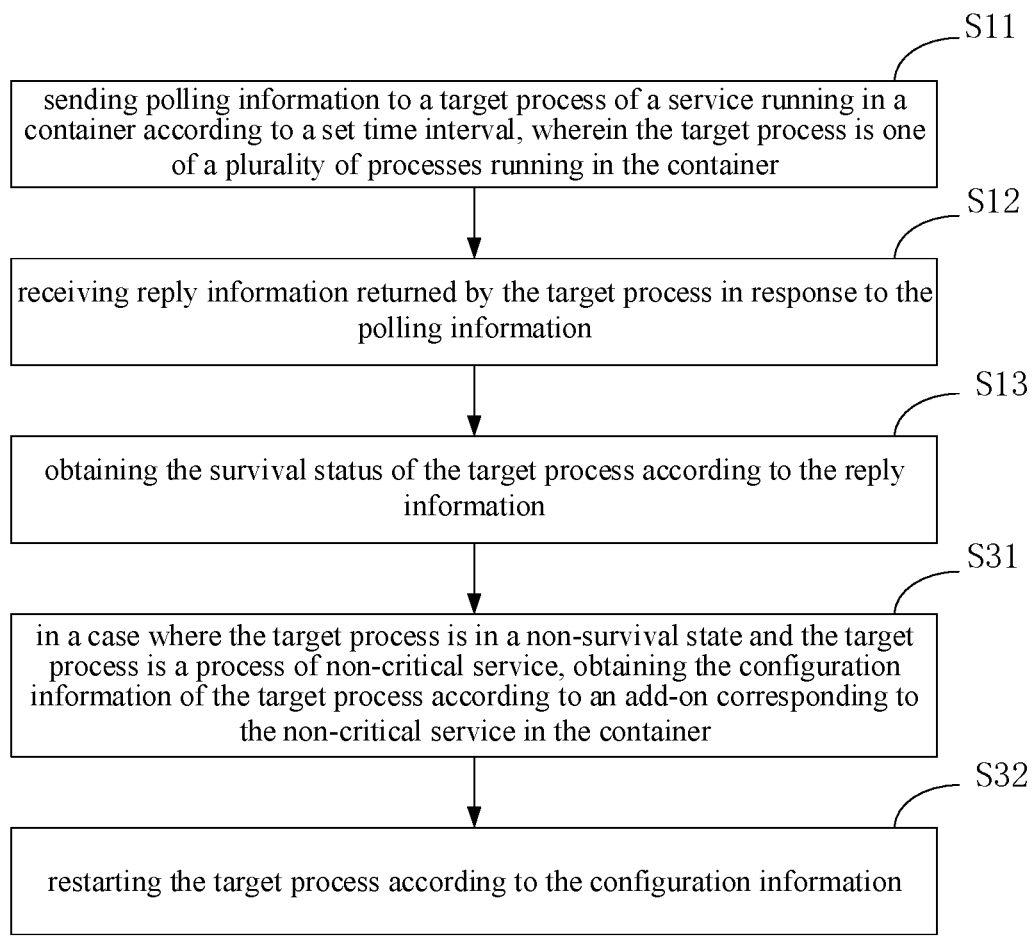
FIG. 3 is a schematic view of a service information processing method according to another embodiment of the present application.

In one implementation, the service includes a non-critical service, and as shown in FIG. 3, the service information processing method may further include:

S31: in a case where the target process is in a non-survival state and the target process is a process of a non-critical service, obtaining configuration information of the target process according to an add-on corresponding to the non-critical service in the container; and S32: restarting the target process according to the configuration information.

In the embodiment, a process can be distinguished as a process of a critical service or a process of a non-critical service by setting a critical flag field for the process.

It is also possible to distinguish a service as a critical service or non-critical service by setting a critical flag field for the service. Generally, a non-critical service can be an accompanying service of a critical service. In a case where the target process is a process of a critical service, the target process is a critical process; in a case where the target process is a process of a non-critical service, it is a non-critical process.

In the embodiment, in a case where the target process is in a non-survival state and the target process is in a process of a non-critical service, the target process is restarted, and the target process may be restarted after a set first time upon the target process is determined to be in the non-survival state through polling.

In the embodiment, for the process of a non-critical service, in a case where the process is in a non-survival state, the process of the non-critical service does not have a dependency relationship with other processes. The process may be restarted independently, without influencing the running of other processes in the container, so that independent keep-alive of a process in the container may be realized, and it is not necessary to rebuild the container. Thereby, the keep-alive cost is reduced, and the example level keep-alive is realized.

Figure 4:
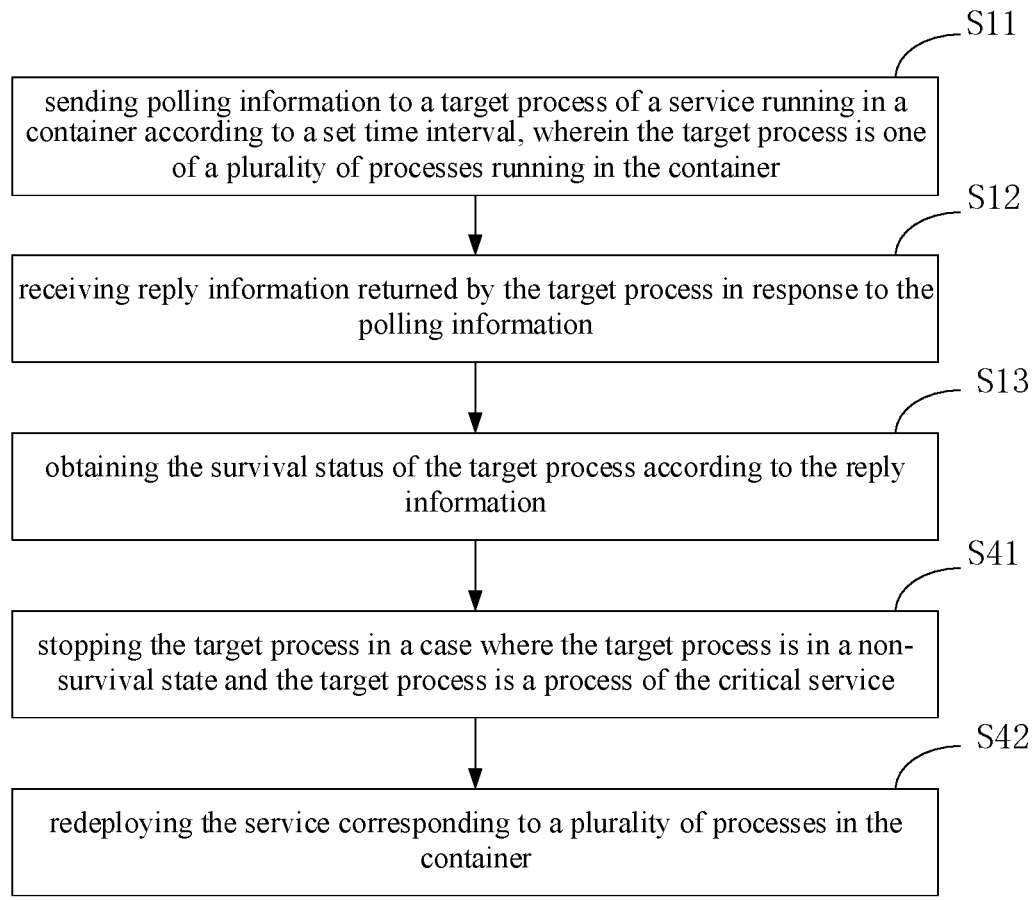
FIG. 4 is a schematic view of a service information processing method according to yet another embodiment of the present application.

In one implementation, the service includes a critical service, and as shown in FIG. 4, the service information processing method may further include:

S41: stopping the target process in a case where the target process is in a non-survival state and the target process is a process of the critical service; and S42: redeploying the service.

In the embodiment, in a case where more than two processes among processes running in the container are processes of the critical service, the more than two processes may generally have dependencies between the processes or may be relied on by a process of a non-critical service. In a case where the process of the critical service is in a non-survival state, the critical service needs to be redeployed, and simultaneously, other services with processes running in the container also need to be redeployed. Specifically, after a process of the critical service is detected to be in the non-survival state for the first period, or when the critical service is detected to be in the non-survival state for a plurality of times, data package of the critical service may be pulled, description information of the critical service may be obtained, and deployment of the critical service may be performed.

When stopping a target process, there may be dependencies between services due to processes of more than two services running in the container, for example, an accompanying service often relying on a critical service. Therefore, when stopping the target process, other processes of the critical service and the non-critical service in the container should also be stopped. When stopping the processes, they are stopped in a first order according to the dependencies between the services. When redeploying the critical service, processes of more than two services need to be started in the reverse order of the first order.

In one example, the processes of the critical service and the processes of the non-critical service as well as the corresponding add-ons may be changed independently. The processes of the critical service and the processes of the non-critical service may also be independently probed and kept alive, and add-ons do not need to be probed and kept alive. A service may be defined whether to be a critical service by a field "is_critical". In a case where the service is a critical service, the value of the "is_critical" field is "true". In a case where both a process of the critical service and a process of the non-critical service are included in the container, the non-critical service depends on the critical service and the overall keep-alive of the container is executed once the critical service is abnormal. If the service is an accompanying service (i.e. a non-critical service), the value of the "is_critical" field is "false", and the non-critical service is not depended on by other services and service abnormity is not reflected on the whole of the container. Only this service is restarted and kept alive without affecting normal operation of other services. Keep-alive semantics are richer, and the keep-alive cost is more flexible and controllable.

In the embodiment, for the process of the critical service, a keep-alive mode different from the process of the non-critical service is adopted, so that multiple processes can be flexibly kept alive while they are running based on a single container. When the independent deployment of the critical service is needed, the independent deployment of the critical service is executed, so that the keep-alive cost is reduced and the service-level keep-alive is supported.

In one implementation, redeploying a service corresponding to a plurality of processes in a container includes:

obtaining description information of a service from a configuration platform, wherein the description information may include resource description and program package description of the service, the resource description is used for recording a resource run by the container of the service, and the program package description is used for configuration information of a process of the service;

obtaining the resource for starting a container to which the service belongs, according to the resource description;

starting the container based on the resource;

creating a process directory of the service and an add-on of the service in the container, according to the program package description, wherein the add-on is used for storing the configuration information of a plurality of processes of the service; and according to the process directory and the add-on, the process of the service being started in the container.

In this embodiment, when a critical service is redeployed, the operation executed is substantially the same as that executed when the critical service is initially deployed. The description information of the critical service is obtained from the configuration platform so that the description information does not need to be manually re-input. The description information may include the resource description and the program package description. The resource description is used for recording a resource run by the container of the critical service, and the program package description is used for configuration information of a process of the critical service, so that the original configuration mode of the PaaS container management system is not changed, and the operations of service redeployment can be reduced.

In one implementation, the service information processing method further includes:

redeploying an accompanying service for a critical service, and the accompanying service and the critical service being deployed in a set order.

In addition, a dependency between services, and starting and stopping order between services may be defined. If a plurality of services are included in the container, and the plurality of services include a critical service and a non-critical service, there is a dependency between services, generally the non-critical service depending on the critical service. For example, if the sequenced service is a critical service, a sequenced process is started in a corresponding container, the accompanying service starts a log record process in the container, the log record process is responsible for the log record of the sequenced process, and the log record process depends on the sequenced process.

When a certain critical service in the embodiment is redeployed, corresponding starting and stopping operations need to be successively carried out on the whole example according to a predefined starting and stopping order. The semantics of service starting and stopping are rich and customizable.

In one implementation, the service information processing method may further include:

obtaining description information of a service from a configuration platform, wherein the service is a critical service or a non-critical service; and the description information being generated according to metadata information of the service, wherein the metadata information of the service is contained in an access request of the service sent to the configuration platform, the description information includes resource description and program package description of the traffic, the resource description is used for recording the resource run by a container of the service, and the program package description is used for the configuration information of the process of the service.

When a user wants to deploy a service in PaaS, an access request of the service is sent to the configuration platform. The access request includes the metadata information of the service. The description information of the service is generated at the configuration platform, and the description information is used for deploying the service.

In this embodiment, the description information is generated according to the metadata information contained in the access request of the service, so that the user can deploy the service only by providing a small amount of metadata information and the access cost of the service is facilitated to get reduced.

Figure 5:
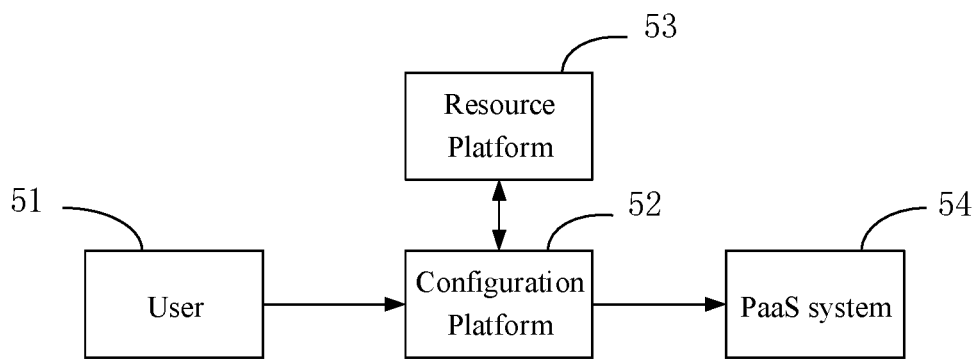
FIG. 5 is a schematic view of a configuration platform according to another example of the present application.

Through a one-stop access configuration platform, as shown in FIG. 5, all links such as service input and resource requirement, authorization account, etc. are got through, and thus user 51 only needs a very small amount of metadata information, such as mirroring address (Address), mirroring version (Version), associated resource order number, etc. The one-stop configuration platform 52 can automatically generate a configuration file, according to default rules, by pulling description information from a resource platform 53 according to the metadata. The configuration file is then sent through api (interface) to the back-end PaaS system 54 to deploy the service, starting the process of the service in the container. After the service is accessed, the starting, stopping, probing, data loading, etc. in the container are executed by means of one suitably developed script (Base).

Figure 6:
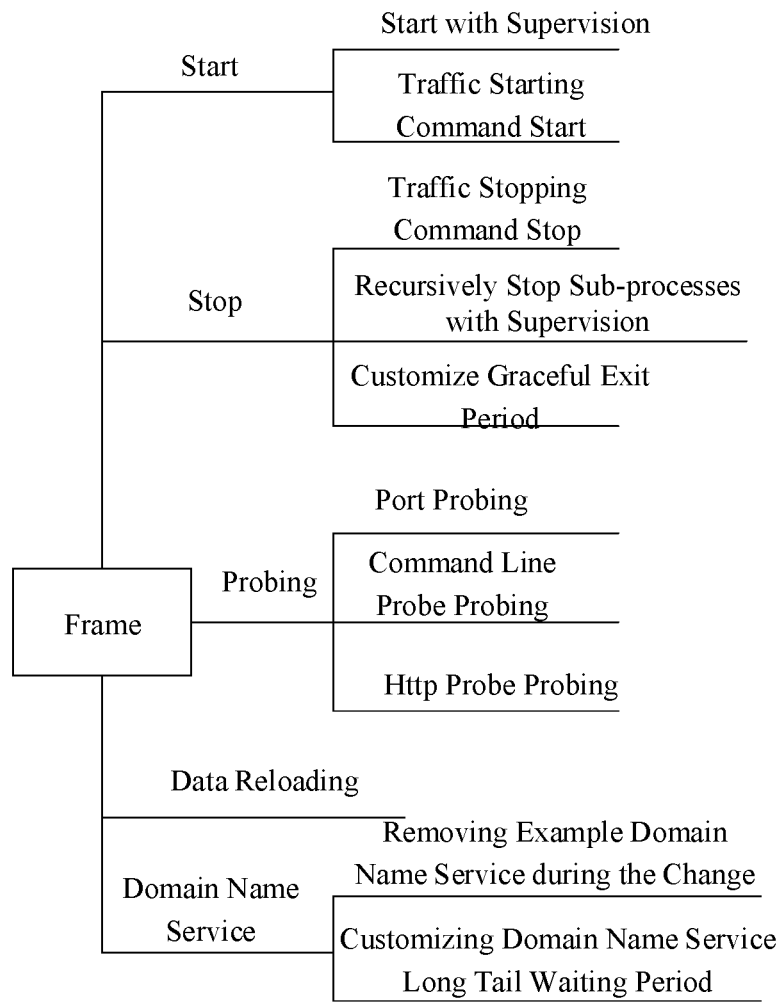
FIG. 6 is a schematic view of an operation frame within a container according to yet another example of the present application.

As with the service information processing framework (Infra) shown in FIG. 6, the platform provides a general control script that defines the behaviors of the script through the configuration file, including probing, stopping, starting, data reloading, domain name service of a process. Wherein, the probing includes two modes of port probing and pointer probing, and in a specific example, the probing of a process can be carried out in any of the two modes. Pointer probing specifically includes two modes of command line pointer probing and HTTP (HyperText Transfer Protocol) pointer probing.

Still referring to FIG. 6, a process stops in three modes: traffic stopping command stops, the sub-process with supervision recursively stops, and the process stops when the customized graceful exit period is reached. In a specific example, a process may be stopped in any mode.

Still referring to FIG. 6, the mode in which a process starts includes both starts with supervision, and traffic starting command starts. In a specific example, a process may be started in any mode.

Domain name service of a process (for example, Baidu Name Service, BNS) is used for service discovery. Still referring to FIG. 6, the domain name service of a process includes two modes: the example domain name service is removed during the change, and the domain name service long tail waiting period is customized. In a specific example, the domain name service of a process may be realized in any mode. The conversion from the development script to the configuration parameters is realized, and the access cost of the traffic is greatly reduced.

In an example, there is a parallel relationship between multiple services in a container, and as for each online change, any one service or any combination of a plurality of services may be arbitrarily selected. The program package description in the description information can be updated. After an update is detected, the updated data are pulled and compared with the data described by the original program package. The difference between the updated data and the data described by the original program package is determined. A new add-on is then generated to replace the original add-on so that the flexible change of any combination in the service online procedure of one container is realized. It is ensured that the service in the container that does not need to be changed does not stop the service; the service that needs to be changed in the container can be changed with a plurality of arbitrarily selected services that have dependencies with it.

Figure 7:
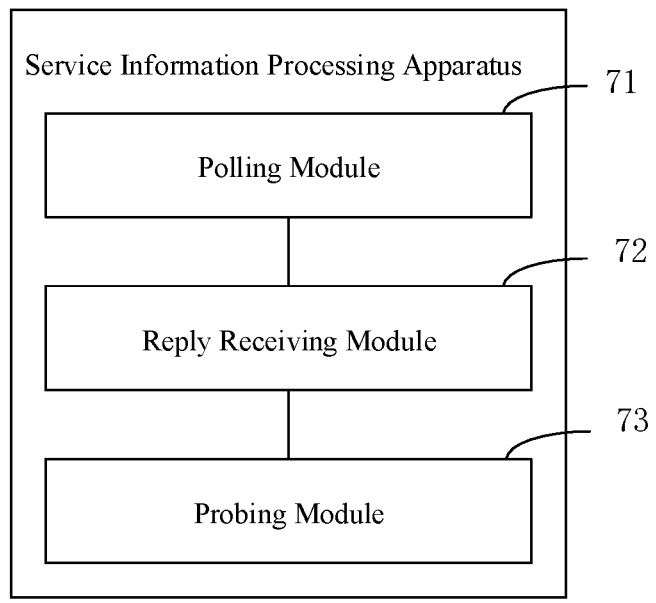
FIG. 7 is a schematic view of a service information processing apparatus according to an embodiment of the present application.

An embodiment of the present application also provides a service information processing apparatus, as shown in FIG. 7, including:

a polling module 71 configured for sending polling information to a target process of a service running in a container according to a set time interval, wherein the target process is one of a plurality of processes running in the container;

a reply receiving module 72 configured for receiving reply information returned by the target process in response to the polling information; and a probing module 73 configured for obtaining a survival status of the target process according to the reply information.

Figure 8:
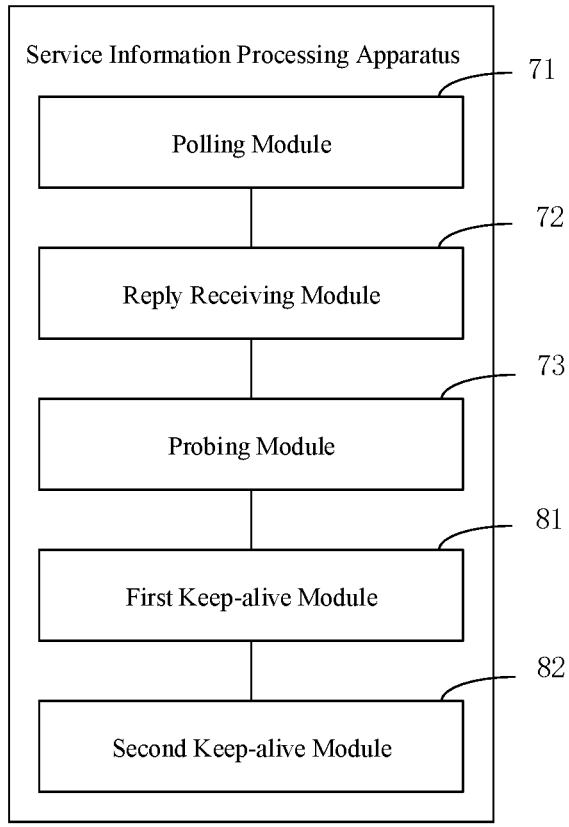
FIG. 8 is a schematic view of a service information processing apparatus according to another embodiment of the present application.

In one implementation, a service includes a non-critical service, and as shown in FIG. 8, the service information processing apparatus may further include:

a first keep-alive module 81 configured for obtaining configuration information of the target process according to an add-on of the non-critical service in the container, in a case where the target process is in a non-survival state and the target process is a process of a non-critical service; and a second keep-alive module 82 configured for restarting the target process according to the configuration information.

Figure 9:
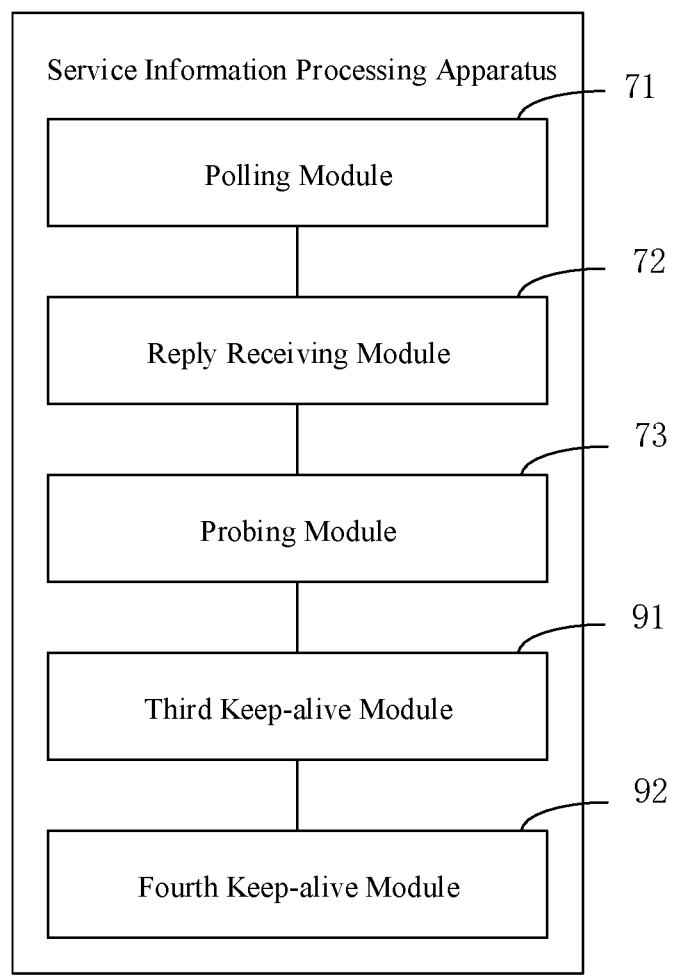
FIG. 9 is a schematic view of a service information processing apparatus according to yet another embodiment of the present application.

In one implementation, a service includes a critical service, and as shown in FIG. 9, the service information processing apparatus may further include:

a third keep-alive module 91 configured for stopping the target process in a case where the target process is in a non-survival state and the target process is a process of a critical service; and a fourth keep-alive module 92 configured for redeploying the service corresponding to a plurality of processes in the container.

Figure 10:
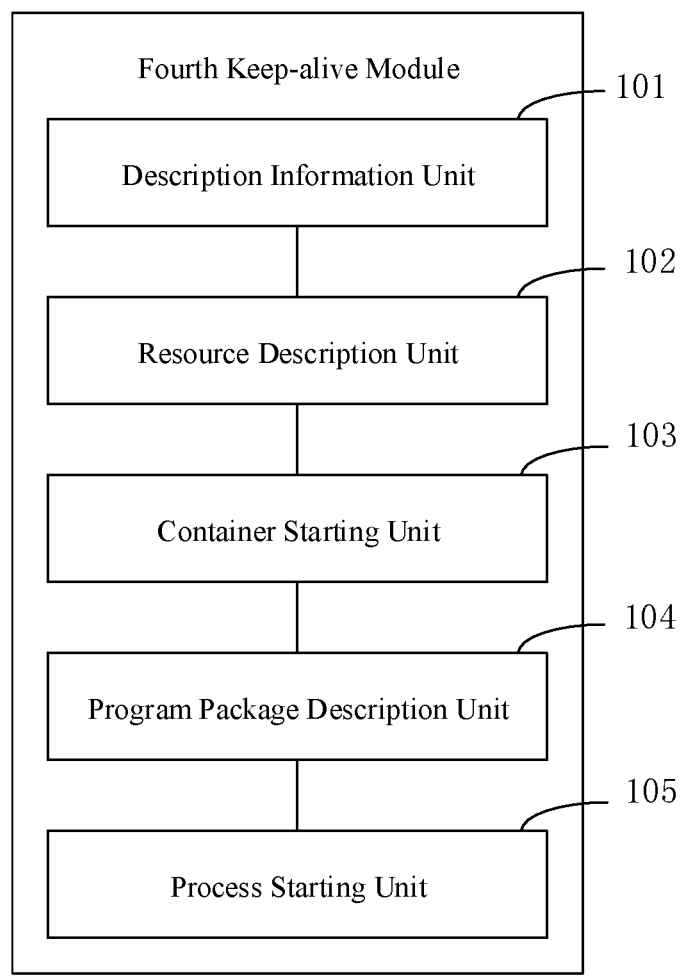
FIG. 10 is a schematic view of a service information processing apparatus according to yet another embodiment of the present application.

In one implementation, as shown in FIG. 10, the fourth keep-alive module 92 may include:

a description information unit 101 configured for obtaining description information of the service from a configuration platform, wherein the description information comprises resource description and program package description of the service, the resource description is used for recording a resource run by the container of the service, and the program package description is used for configuration information of the process of the service;

a resource description unit 102 configured for obtaining a resource for starting the container to which the service belongs, according to the resource description;

a container starting unit 103 configured for starting the container based on the resource;

a program package description unit 104 configured for creating a process directory of the service and an add-on of the service in the container, according to the program package description, wherein the add-on is used for storing the configuration information of a plurality of processes of the service; and a process starting unit 105 configured for starting the process of the service in the container, according to the process directory and the add-on.

Figure 11:
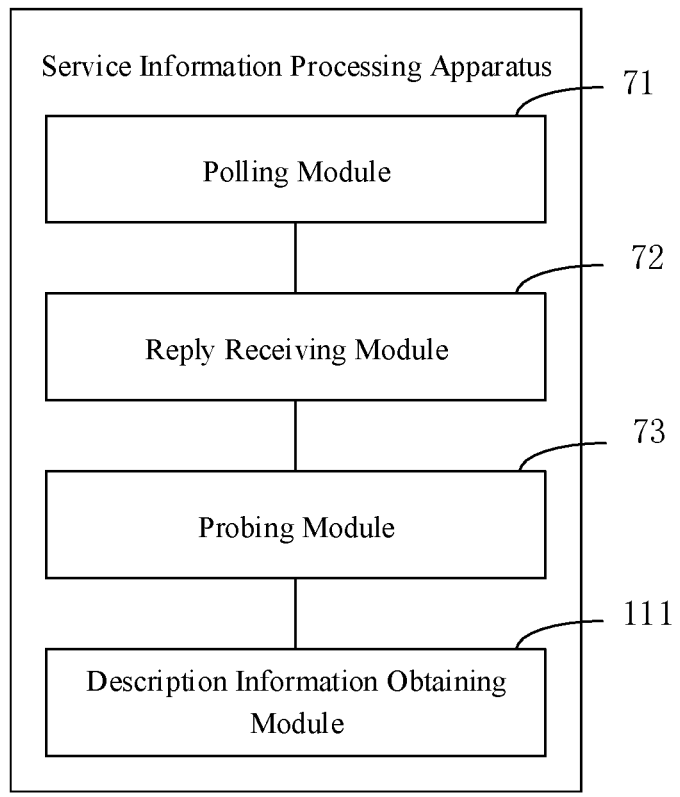
FIG. 11 is a schematic view of a service information processing apparatus according to yet another embodiment of the present application.

In one implementation, as shown in FIG. 11, the service information processing apparatus may further include:

a description information obtaining module 111 configured for obtaining the description information of the service from a configuration platform;

wherein, the description information being generated according to metadata information of the service, and the metadata information of the service being contained in an access request of the service sent to the configuration platform, the description information comprising resource description and program package description of service, the resource description being used for recording the resource run by the container of the service, and the program package description being used for the configuration information of the process of the service.

The functions of the respective modules/units in the respective apparatuses according to the embodiments of the present application may refer to the corresponding descriptions in the above-mentioned methods and will not be described in detail herein.

According to an embodiment of the application, the application also provides an electronic device and a readable storage medium.

Figure 12:
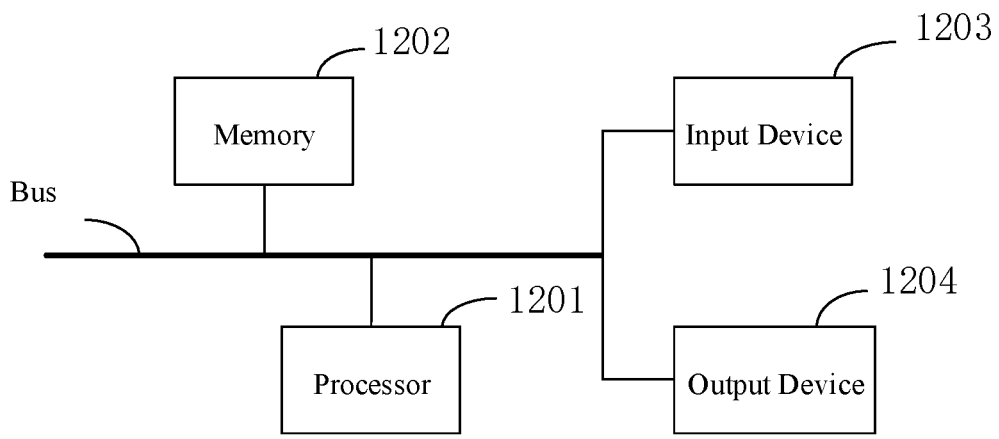
FIG. 12 is a block diagram of an electronic device for implementing a service information processing method of an embodiment of the present application.

FIG. 12 is a block diagram of an electronic device for a service information processing method of an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile apparatuses, such as personal digital assistants, cellular telephones, smartphones, wearable device, and other similar computing apparatuses. The components shown herein, their connections and relationships, and their functions are by way of example only and are not intended to limit the implementations of the application described and/or claimed herein.

As shown in FIG. 12, the electronic device includes one or more processors 1201, a memory 1202, and interfaces for connecting components, including high-speed interfaces and low-speed interfaces. The various components are interconnected using different buses and may be mounted on a common motherboard or otherwise as required. The processor may process instructions for execution within the electronic device, including instructions stored in memory or in memory to display graphical information of the GUI on an external input/output device (such as display device coupled to the interface). In other embodiments, multiple processors and/or multiple buses may be used with multiple memories, if desired. Likewise, multiple electronic devices may be connected, and each of them may provide some of the necessary manipulations (e.g., as an array of servers, a set of blade servers, or a multiprocessor system). One processor 1201 is shown as an example in FIG. 12.

Memory 1202 is a non-transitory computer-readable storage medium provided by the present application. The memory stores instructions executable by at least one processor to cause the at least one processor to execute the service information processing method provided by the present application. The non-transitory computer-readable storage medium of the present application stores computer instructions for causing a computer to execute the service information processing method provided herein.

Memory 1202, as a non-transitory computer-readable storage medium, may be used to store non-transitory software programs, non-transitory computer-executable programs and modules, such as program instructions/modules corresponding to the service information processing method in the embodiment of the present application (e.g., polling module 71, reply receiving module 72, and probing module 73 shown in FIG. 7). The processor 1201 executes various functional applications and data processing of the server, i.e., may implement the service information processing method in the respective above-mentioned method embodiments by running non-transient software programs, instructions, and modules stored in the memory 1202.

The memory 1202 can include a storage program area and a storage data area, wherein the storage program area can store an operating system and application programs required by at least one function; the storage data area may store data or the like created according to the use of service information processing electronic device. In addition, the memory 1202 may include high-speed random access memory, and may also include non-transitory memory, such as at least one disk storage components, flash memory components, or other non-transitory solid state storage components. In some embodiments, the memory 1202 may optionally include a memory remotely set with respect to the processor 1201. The remote memories may be connected to the service information processing electronic apparatus via a network. Examples of the above-mentioned network includes, but is not limited to, the Internet, intranets, local area networks, mobile communication networks, and combinations thereof.

The electronic device of the service information processing method may further include: input device 1203 and output device 1204. The processor 1201, memory 1202, input device 1203, and output device 1204 may be connected by a bus or other means, exemplified by a bus connection in FIG. 12.

The input device 1203 may receive input numeric or character information and generate key signal input related to user settings and functional controls of electronic device for service information processing, for example, may include a touch screen, a keypad, a mouse, a track pad, a touch pad, an indicating arm, one or more mouse buttons, a track ball, a joystick, and like input devices. The output device 1204 may include display device, auxiliary lighting device (e.g., LED), tactile feedback device (e.g., vibration motor), etc. The display device may include, but is not limited to, a liquid crystal display (LCD), a light emitting diode (LED) display, and a plasma display. In some implementations, the display device may be a touch screen.

The various implementations of the systems and techniques described herein can be implemented in digital electronic circuit systems, integrated circuit systems, application specific ASIC (Application Specific Integrated Circuit), computer hardware, firmware, software, and/or combinations thereof. These various embodiments may include: implementing in one or more computer programs, which can be executed and/or interpreted on a programmable system including at least one programmable processor. The programmable processor can be a dedicated or general-purpose programmable processor, which can receive data and instructions from, and transmit data and instructions to, a storage system, at least one input device, and at least one output device.

These computing programs (also referred to as programs, software, software applications, or code), include machine instructions of a programmable processor, and may be implemented using high-level procedural and/or object-oriented programming languages, and/or assembly/machine language. As used herein, the terms "machine-readable medium" and "computer-readable medium" refer to any computer program product, apparatus, and/or device (such as a magnetic disk, an optical disk, a memory and a programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide interaction with a user, the systems and techniques described herein may be implemented on a computer having: a display device (e.g., a CRT (cathode ray tube) or LCD (liquid crystal display) monitor) for displaying information to a user; and a keyboard and a pointing device (e.g., a mouse or a trackball) through which a user can provide the input to the computer. Other types of devices may also be used to provide an interaction with a user; for example, the feedback provided to the user may be any form of sensory feedback, (e.g., visual feedback, auditory feedback, or tactile feedback); the input from the user may be received in any form (including acoustic input, voice input, or tactile input).

The systems and techniques described herein may be implemented in a computing system that includes a background part (e.g., as a data server), or in a computing system that includes a middleware part (e.g., an application server), or in a computing system that includes a front-end part (e.g., a user computer having a graphical user interface or a web browser through which a user may interact with implementations of the systems and techniques described herein), or in a computing system that includes any combination of such background part, middleware part or front-end part. The parts of the system may be interconnected by any form or medium of digital data communication (such as a communication network). Examples of the communication network include local area network (LAN), wide area network (WAN), and the Internet.

The computer system may include a client and a server. The client and server are generally remote from each other and generally interact through a communication network. The relationship of the client and the server is generated by computer programs running on a corresponding computer and having a client-server relationship with each other. The server can be a cloud server, also called a cloud computing server or a cloud host, and is a host product in a cloud computing service system for solving the defects of high management difficulty and weak traffic expansibility in the traditional physical host and virtual private server (VPS) service. The server may also be a server of a distributed system, or a server incorporating a blockchain.

According to the technical scheme of the embodiment of the application, the target process is one of a plurality of processes running in the container. For the target process, the embodiment of the application independently polls the information to execute the probing of the target process. Therefore, other processes in the container can be independently probed so that based on the traditional PaaS single container, multiple processes are run in the single container and container resources are saved.

The embodiment of the application supports flexible deployment of multiple services of the single container, can flexibly increase and decrease the services, and can independently change or be arbitrarily combined to change the service.

Two keep-alive modes of service-level restart and example-level reconstruction are supported, aiming at process keep-alive of the critical service and process keep-alive of the non-critical service respectively, so that the keep-alive is more flexible and the cost is less.

The traffic access container only needs a user to provide very simple metadata to realize one-stop platform access, and configuration files and universal control script platformization, and the control scripts for control and starting are simple and easy to deploy. Through the service information processing method and device in the embodiment of the application, the time cost of the new traffic access search domain PaaS system is shortened from an average of 8 days to 1 day.

It should be understood that the various forms of the flow shown above can be used to re-sequence, add or delete steps. For example, the steps recited in the present application may be executed in parallel or successively or may be executed in a different order, so long as the desired result of the technical solutions disclosed in the present application can be achieved, and no limitation is made herein.

The above-mentioned specific embodiments are not to be construed as limiting the scope of the present application. It will be apparent to those skilled in the art that various modifications, combinations, sub-combinations, and substitutions are possible, depending on design requirements and other factors. Any modifications, equivalents, improvements, etc. that come within the spirit and principles of this application are intended to be included within the scope of this application.

What is claimed is:

1. A service information processing method, comprising:
sending polling information to a target process of a service running in a container according to a set time interval, wherein the target process is one of a plurality of processes running in the container;
receiving reply information returned by the target process in response to the polling information;
obtaining a survival status indicating whether running of the target process is abnormal according to the reply information; and
performing a keep-alive operation on the target process, after the running of the target process is determined to be abnormal according to the survival status and a set period is reached.

2. The method of claim 1, wherein the service comprises a non-critical service, the method further comprising:
in a case where the target process is in a non-survival state and the target process is a process of a non-critical service, obtaining configuration information of the target process according to an add-on of the non-critical service in the container; and
restarting the target process according to the configuration information.

3. The method of claim 1, wherein the service comprises a critical service, the method further comprising:
stopping the target process in a case where the target process is in a non-survival state and the target process is a process of a critical service; and
redeploying the service.

4. The method of claim 3, wherein the redeploying the service comprises:
obtaining description information of the service from a configuration platform, wherein the description information comprises resource description and program package description of the service, the resource description is used for recording a resource run by the container of the service, and the program package description is used for configuration information of the process of the service;
obtaining a resource for starting the container to which the service belongs, according to the resource description;
starting the container based on the resource;
creating a process directory of the service and an add-on of the service in the container, according to the program package description, wherein the add-on is used for storing the configuration information of a plurality of processes of the service; and
starting the process of the service in the container, according to the process directory and the add-on.

5. The method of claim 1, further comprising:
obtaining the description information of the service from a configuration platform;
wherein, the description information being generated according to metadata information of the service, and the metadata information of the service being contained in an access request of the service sent to the configuration platform, the description information comprising resource description and program package description of service, the resource description being used for recording the resource run by the container of the service, and the program package description being used for the configuration information of the process of the service.

6. A service information processing apparatus, comprising:
a processor and a memory for storing one or more computer programs executable by the processor,
wherein when executing at least one of the computer programs, the processor is configured to perform operations comprising:
sending polling information to a target process of a service running in a container according to a set time interval, wherein the target process is one of a plurality of processes running in the container;
receiving reply information returned by the target process in response to the polling information;
obtaining a survival status indicating whether running of the target process is abnormal according to the reply information; and
performing a keep-alive operation on the target process, after the running of the target process is determined to be abnormal according to the survival status and a set period is reached.

7. The apparatus of claim 6, wherein the service comprises a non-critical service, when executing at least one of the computer programs, the processor is configured to further perform operations comprising:
obtaining configuration information of the target process according to an add-on of the non-critical service in the container, in a case where the target process is in a non-survival state and the target process is a process of a non-critical service; and
restarting the target process according to the configuration information.

8. The apparatus of claim 6, wherein the service comprises a critical service, when executing at least one of the computer programs, the processor is configured to further perform operations comprising:
stopping the target process in a case where the target process is in a non-survival state and the target process is a process of a critical service; and
redeploying the service.

9. The apparatus of claim 8, wherein when executing at least one of the computer programs, the processor is configured to further perform operations comprising:
obtaining description information of the service from a configuration platform, wherein the description information comprises resource description and program package description of the service, the resource description is used for recording a resource run by the container of the service, and the program package description is used for configuration information of the process of the service;
obtaining a resource for starting the container to which the service belongs, according to the resource description;
starting the container based on the resource;
creating a process directory of the service and an add-on of the service in the container, according to the program package description, wherein the add-on is used for storing the configuration information of a plurality of processes of the service; and
starting the process of the service in the container, according to the process directory and the add-on.

10. The apparatus of claim 6, wherein when executing at least one of the computer programs, the processor is configured to further perform operations comprising:

obtaining the description information of the service from a configuration platform; and wherein, the description information being generated according to metadata information of the service, and the metadata information of the service being contained in an access request of the service sent to the configuration platform, the description information comprising resource description and program package description of service, the resource description being used for recording the resource run by the container of the service, and the program package description being used for the configuration information of the process of the service.

11. A non-transitory computer-readable storage medium storing computer instructions, the computer instructions causing a computer to execute the service information processing method of claim 1.

12. A non-transitory computer-readable storage medium storing computer instructions, the computer instructions causing a computer to execute the service information processing method of claim 2.

13. A non-transitory computer-readable storage medium storing computer instructions, the computer instructions causing a computer to execute the service information processing method of claim 3.

14. A non-transitory computer-readable storage medium storing computer instructions, the computer instructions causing a computer to execute the service information processing method of claim 4.

15. A non-transitory computer-readable storage medium storing computer instructions, the computer instructions causing a computer to execute the service information processing method of claim 5.

* * * * *